(12) United States Patent
Ishitani

(10) Patent No.: US 8,325,310 B2
(45) Date of Patent: Dec. 4, 2012

(54) LIQUID CRYSTAL DISPLAY DEVICE AND MANUFACTURING METHOD THEREOF

(75) Inventor: Tetsuji Ishitani, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1164 days.

(21) Appl. No.: 12/120,767

(22) Filed: May 15, 2008

(65) Prior Publication Data

US 2008/0284970 A1 Nov. 20, 2008

(30) Foreign Application Priority Data

May 18, 2007 (JP) .................................. 2007-132591

(51) Int. Cl.
*G02F 1/1339* (2006.01)
*G02F 1/1343* (2006.01)

(52) U.S. Cl. .................... 349/153; 349/155; 349/139

(58) Field of Classification Search .................. 349/139, 349/153, 155, 156
See application file for complete search history.

(56) References Cited

U.S. PATENT DOCUMENTS

| | | | |
|---|---|---|---|
| 4,691,995 A | | 9/1987 | Yamazaki et al. |
| 5,556,670 A | * | 9/1996 | Mihara et al. ................... 428/1.5 |
| 5,982,471 A | | 11/1999 | Hirakata et al. |
| 6,011,609 A | * | 1/2000 | Kato et al. ..................... 349/190 |
| 6,147,738 A | * | 11/2000 | Okamoto ....................... 349/122 |
| 6,177,974 B1 | | 1/2001 | Hirakata et al. |
| 6,184,954 B1 | | 2/2001 | Inoue et al. |
| 6,236,444 B1 | | 5/2001 | Konuma et al. |
| 6,285,435 B1 | | 9/2001 | Inoue et al. |
| 6,392,736 B1 | * | 5/2002 | Furukawa et al. ............ 349/158 |
| 6,404,480 B2 | | 6/2002 | Hirakata et al. |
| 6,636,192 B1 | | 10/2003 | Saitoh |
| 6,841,883 B1 | * | 1/2005 | Farnworth et al. ............ 257/777 |
| 6,980,275 B1 | | 12/2005 | Konuma et al. |
| 7,068,339 B2 | | 6/2006 | Nakamura et al. |
| 7,088,418 B1 | | 8/2006 | Yamashita et al. |
| 7,505,096 B2 | * | 3/2009 | Lee et al. ....................... 349/110 |

(Continued)

FOREIGN PATENT DOCUMENTS

JP 62-054225 3/1987

(Continued)

OTHER PUBLICATIONS

Search Report (European Patent Application No. 08009120.0) mailed Sep. 4, 2008.

*Primary Examiner* — Richard Kim
*Assistant Examiner* — David Chung
(74) *Attorney, Agent, or Firm* — Fish & Richardson P.C.

(57) ABSTRACT

To further ensure the electrical connection of a conductor between an opposite electrode of an opposite substrate and a connection wiring of a TFT substrate, and to prevent diffusion of impurities contained in a sealing material mixed with conductive particles or a conductive paste into a liquid crystal layer. In order to isolate the sealing material containing a conductive particle or the conductive paste from the liquid crystal layer, the shape of top surface of the sealing material is a shape in which a plurality of circular shapes are combined, which is a shape having no opening. Further, the sealing material forms a plurality of compartments such that a compartment in which a pixel region is provided and a compartment in which a conductor is provided are blocked out.

17 Claims, 6 Drawing Sheets

U.S. PATENT DOCUMENTS

| | | |
|---|---|---|
| 7,940,360 B2 | 5/2011 | Ishitani |
| 2004/0125299 A1 | 7/2004 | Nakamura et al. |
| 2006/0203168 A1 | 9/2006 | Ishitani |
| 2011/0205475 A1 | 8/2011 | Ishitani |

FOREIGN PATENT DOCUMENTS

| | | |
|---|---|---|
| JP | 62-054229 | 3/1987 |
| JP | 02-149919 U | 12/1990 |
| JP | 05-127172 A | 5/1993 |
| JP | 06-273777 | 9/1994 |
| JP | 10-228030 A | 8/1998 |
| JP | 11-002826 A | 1/1999 |
| JP | 2005-181514 | 7/2005 |
| JP | 2005-202360 | 7/2005 |
| JP | 2006-268020 | 10/2006 |
| JP | 2007-025518 A | 2/2007 |

* cited by examiner

LIQUID CRYSTAL DISPLAY DEVICE AND MANUFACTURING METHOD THEREOF

BACKGROUND OF THE INVENTION

1. Field of the Invention

The present invention relates to a method for manufacturing a liquid crystal display device. The present invention relates to, for example, a method for manufacturing an electro-optical device typified by a liquid crystal display panel which has a circuit including a thin film transistor (hereinafter referred to as a TFT), and a method for manufacturing an electronic device equipped with such an electro-optical device as a component.

2. Description of the Related Art

In recent years, a technique for forming a thin film transistor (TFT) using a semiconductor thin film (with a thickness of about several nm to several hundreds nm) which is formed over a substrate having an insulating surface has attracted attention. The thin film transistor is widely applied to an electronic device such as an IC or an electro-optical device, and has been hurriedly developed particularly as a switching element of an image display device.

A liquid crystal display device is known as an image display device. Active matrix liquid crystal display devices have been commonly used because a high-definition image can be obtained as compared with the case of a passive matrix liquid crystal display device. In the active matrix liquid crystal display device, an image is displayed on a screen by driving pixel electrodes arranged in matrix. Specifically, by applying a voltage between a selected pixel electrode and an opposite electrode that faces the pixel electrode, optical modulation of a liquid crystal layer interposed between the pixel electrode and the opposite electrode is performed, and this optical modulation is recognized as an image.

The range of application of such an active matrix electro-optical device is increased, and demands for high definition, high aperture ratio, and high reliability have been increasing in accordance with increase of screen size. At the same time, demands for progress in productivity and cost reduction have also been increasing.

In addition, as panel size increases, the cost of a material to be used is increased. In particular, a liquid crystal material interposed between a pixel electrode and an opposite electrode is expensive.

In the case where a liquid crystal injection method is used, sealing of liquid crystals requires a complicated process of seal drawing, attachment of an opposite substrate, cutting, injection of liquid crystals, sealing of an inlet for injecting liquid crystals, and/or the like. In particular, as the panel size increases, it becomes difficult to fill a region (including at least a pixel portion) surrounded by a sealant with liquid crystals because liquid crystal injection is performed using a capillary phenomenon. Further, when liquid crystal injection is performed using a capillary phenomenon, liquid crystals which are more than liquid crystals which are injected into the inlet for injecting liquid crystals is used and wasteful liquid crystals occur.

In addition, in the case where the liquid crystal injection method is used, in which two substrates are attached, cutting is performed thereon, and a liquid crystal material is injected through the inlet for injecting liquid crystals, which is formed in the cut surface. However, a portion serving as a path of the liquid crystal material, which extends from the inlet for injecting liquid crystals to a pixel region, is also filled with liquid crystals. As described above, a portion other than the region for forming a display portion is also filled with the liquid crystal material.

In addition, a portion of the path of the liquid crystal material, which extends from the inlet for injecting liquid crystals to the pixel region, particularly, near the inlet for injecting liquid crystals, is a portion through which liquid crystals which are extremely more than through the other portion of a panel pass, and friction generated at the time of injection changes the surface of an alignment film, which may cause disorder of orientation of liquid crystals.

In addition, in the liquid crystal injection method, a step of sealing the inlet for injecting liquid crystals after injection of liquid crystals is needed.

The present applicant has proposed a technique in which liquid crystals are dropped and then a pair of substrates is attached to each other under reduced pressure, as a method for manufacturing a liquid crystal display device without using a liquid crystal injection method, in Patent Document 1 (U.S. Pat. No. 4,691,995).

Further, the present applicant has proposed a technique in which a conductor for connection to an opposite electrode is disposed inside of a sealing material and a barrier wall is provided so as to surround the conductor in Patent Document 2 (Japanese Published Patent Application No. 2006-268020).

The technology disclosed in Patent Document 1 is called a liquid crystal dropping method (ODF: one drop fill). The liquid crystal dropping method can eliminate material loss because liquid crystals as many as necessary are dropped only in a necessary portion. In addition, since a seal pattern has a closed-loop shape, an inlet for injecting liquid crystals is not needed. In addition, a defect caused by change of the surface of an alignment film in a path of liquid crystals (e.g., defective orientation) can be eliminated.

Further, a process sequence of the liquid crystal dropping method is largely different from that of the liquid crystal injection method.

A procedure for manufacturing a liquid crystal display device by the liquid crystal injection method is explained below. First, a sealing material is drawn on an opposite substrate by a screen printing method or with a dispensing apparatus. Next, the opposite substrate and another substrate are disposed so as to face each other, the sealing material is hardened, and the substrates are attached to each other. Next, the pair of substrates is cut such that part of the sealing material (an inlet for injecting liquid crystals) is located in an edge surface of the substrates. Next, the pair of substrates is disposed in a chamber where the pressure is reduced, and the pressure inside the chamber is gradually returned from reduced pressure to atmospheric pressure while a liquid crystal material is in contact with the inlet for injecting liquid crystals, whereby liquid crystals are injected using a capillary phenomenon through the inlet for injecting liquid crystals. Next, the inlet for injecting liquid crystals is sealed with a sealant, and the sealant is hardened by ultraviolet irradiation. Lastly, heat treatment for aligning the orientation of liquid crystals is performed thereon.

Next, a procedure for manufacturing a liquid crystal display device by the liquid crystal dropping method is explained below. First, a closed-loop pattern of a sealing material is drawn on an opposite substrate with a dispensing apparatus. Next, liquid crystals are dropped in a region surrounded by the sealing material on the opposite substrate by a desired amount. Next, the opposite substrate and another substrate are attached to each other under reduced pressure. Next, the pressure of the atmosphere surrounding the pair of substrates is changed from reduced pressure to atmospheric pressure. Next, ultraviolet irradiation is performed thereon to harden the sealing material. Next, heat treatment for further hardening the sealing material and heat treatment for aligning the orientation of liquid crystals are performed at the same time. Lastly, the pair of substrates is cut.

In the liquid crystal injection method, a pair of substrates are attached and cut, and then liquid crystals are injected; whereas, in the liquid crystal dropping method, liquid crystals are dropped on one of a pair of substrates, the pair of substrates is attached to each other under reduced pressure, and then the pair of substrates is cut.

Further, as for the heat treatment which is needed to align the orientation of liquid crystals, heat treatment is performed to align the orientation of liquid crystals after a sealant is hardened in the liquid crystal injection method. On the other hand, in the liquid crystal dropping method, heat treatment for hardening a sealing material and heat treatment for aligning the orientation of liquid crystals are performed at the same time; thus a liquid crystal display device is manufactured efficiently.

SUMMARY OF THE INVENTION

The timing of hardening a sealing material in the liquid crystal dropping method is different from that in the liquid crystal injection method. In the liquid crystal injection method, a sealing material which has been hardened by heat press and liquid crystals are in contact with each other, and therefore, impurities less diffuse from the hardened sealing material into the liquid crystals. On the other hand, in the liquid crystal dropping method, a sealing material which has not been hardened and liquid crystals are in contact with each other. Since liquid crystals have fluidity and liquid crystal molecules move over a wide range, there is a problem in that impurities are penetrated into liquid crystals in a step of heating for hardening a sealing material. It is an object of the present invention to provide a structure in which the amount of impurities which are penetrated into liquid crystals is reduced when a liquid crystal display device is manufactured by the liquid crystal dropping method.

Further, when a liquid crystal mode such as a TN mode, a VA mode, or an OCB mode which is driven by applying voltage between a pair of substrates, is operated by active matrix driving, voltage is applied through a flexible printed circuit (FPC) which is attached to an active matrix substrate; therefore, in order to generate potential difference between the pair of substrates, a conductor (a common contact portion) which electrically connects an opposite electrode of an opposite substrate to a connection wiring of the active matrix substrate is needed.

A method for forming the conductor is as follows: a sealing material in which a plurality of conducive particles is mixed is applied on a conductive portion of one substrate of a pair of substrates, and the pair of substrates are attached to each other so that the conductive particles which are formed in the conductive portion are in contact with electrodes provided for the pair of substrates respectively, thereby electrically connecting an opposite electrode of an opposite substrate to a connection wiring of an active matrix substrate. It is an object of the present invention to further ensure the electrical connection of the conductor between the opposite electrode of the opposite substrate and the connection wiring of a TFT substrate.

Also in this method for forming the conductor, different sealing materials are used in the liquid crystal injection method and the liquid crystal dropping method, and a plurality of conductive particles mixed into a sealing material which has not been hardened is disposed in the conductive portion in the liquid crystal dropping method. Therefore, the sealing material mixed with the plurality of conductive particles and liquid crystals are in contact with each other. Since mixing of the plurality of conductive particles into the sealing material is performed in advance, the liquid crystal dropping method is at high risk of penetration of impurities from outside during the mixing. Further, if conductive particles to which impurities are attached and a sealing material are mixed, the impurities attached to the conductive particles may be penetrated into the sealing material.

When heat treatment for hardening a sealing material and aligning the orientation of liquid crystals is performed while this sealing material containing impurities and liquid crystals are in contact with each other, the impurities are diffused into the liquid crystals and display on a liquid crystal panel is adversely affected. This is because, since liquid crystals have fluidity and liquid crystal molecules can move over a wide range, diffusion of the impurities over an entire of a liquid crystal layer is performed in a short period of time, which adversely affects notably display on a liquid crystal panel even if the amount of the impurities is quite small.

Further, there is another method for forming a conductor, in which a conductive paste such as a silver paste or a gold paste instead of a sealing material mixed with conductive particles is disposed in a conductive portion. However, the method is also at high risk of penetration of impurities into the silver paste or the gold paste in advance.

It is an object of the present invention to prevent the diffusion of impurities contained in a sealing material mixed with conductive particles or a conductive paste into a liquid crystal layer.

One feature of the present invention is a liquid crystal display device including a pixel electrode and a connection wiring which are formed over a first substrate, an opposite electrode formed over a second substrate, and a sealing material and a conductive particle which electrically connects the connection wiring to the opposite electrode between the first substrate and the second substrate, in which a first space and a second space which are surrounded by the first substrate, the second substrate, and the sealing material are included, the first space overlaps the connection wiring, the conductive particle is disposed inside the first space, the second space overlaps the pixel electrode, and a liquid crystal layer is disposed inside the second space.

Note that the first space and the second space are provided so as to be blocked out by the sealing material. Further, an organic material having conductivity is disposed in the first space. Further, the conductive particle may be in contact with a second sealing material.

One feature of the present invention is a liquid crystal display device including a first substrate having a display portion having a pixel electrode, a conductive portion, and a terminal portion, a second substrate having an opposite electrode, and a liquid crystal layer between the first substrate and the second substrate, in which a first space surrounded by the first substrate, the second substrate, and a sealing material overlaps the conductive portion, a second space surrounded by the first substrate, the second substrate, and the sealing material overlaps the display portion, the sealing material is disposed between the display portion and the terminal portion, the sealing material is disposed between the conductive portion and the terminal portion, the sealing material is disposed between the display portion and the conductive portion, the terminal portion has a first connection terminal and a second connection terminal, the first connection terminal is electrically connected to the opposite electrode through the conductive portion, and the second connection terminal is electrically connected to the pixel electrode.

Note that an organic material having conductivity is disposed in the first space. Further, a second sealing material is provided in the conductive portion, and a conductive particle may be contained in the second sealing material. Further, a connection wiring which is electrically connected to the first connection terminal is provided in the conductive portion, and a conductive particle is provided between the connection wiring and the opposite electrode.

One feature of the present invention is a method for manufacturing a liquid crystal display device, in which a first sealing material is formed over one substrate of a pair of substrates, a second sealing material containing a conductive particle is formed over a first region surrounded by the first sealing material, liquid crystals are dropped over a second region surrounded by the first sealing material, and the pair of substrates is attached to each other under reduced pressure.

Note that the first sealing material is formed in the boundary between the first region and the second region. Further, the formation of the first sealing material and the second sealing material are performed by an ink-jet method.

One feature of the present invention is a method for manufacturing a liquid crystal display device, in which a sealing material is formed over one substrate of a pair of substrates, a composition containing an organic material having conductivity is dropped over a first region surrounded by the sealing material, liquid crystals are dropped over a second region surrounded by the sealing material, and the pair of substrates is attached to each other under reduced pressure.

Note that the sealing material is formed in the boundary between the first region and the second region. Further, the composition containing an organic material having conductivity contains a nanoparticle. Further, the application of the composition containing an organic material having conductivity is performed by an inkjet method. Further, the formation of the sealing material is performed by an inkjet method.

In order to isolate a sealing material containing a conductive particle or a conductive paste from a liquid crystal layer, the shape of top surface of the sealing material is a shape in which a plurality of circular shapes are combined, which is a shape having no opening. Further, the sealing material forms a plurality of compartments such that a compartment in which a pixel region is provided and a compartment in which a conductor is provided are blocked out. Further, the sealing material is formed such that a first space in which the conductor is provided and a second space in which the pixel region is provided are provided so as to be blocked out.

Further, in order to reduce the frame size, the outer peripheral shape of the sealing material is made rectangular and a conductive particle is disposed at each corner of the rectangle. Alternatively, the outer peripheral shape of the sealing material is made a shape formed of a plurality of sides and a curve which connects the sides, i.e., a rectangular-like shape in which each corner is a curve, and a conductive particle is disposed inside the curve of the shape. A sealing material which partitions the conductive particle and the liquid crystal layer from each other and connects to the sealing material in the outer periphery is disposed and the liquid crystal layer is disposed inside this sealing material (an inner peripheral shape of the sealing material). Note that the number of conductive portions is at least one.

In the conductive portion, a conductive particle in which the surface of an insulating sphere is covered with a metal thin film can be disposed. Typically, a conductive particle in which the surface of a sphere formed of an organic insulating material is covered with a metal thin film, a conductive particle in which the surface of a sphere formed of an inorganic insulating material is covered with a metal thin film, or a conductive particle in which the surface of a sphere formed of an organic insulating material is provided with a stack of different metal thin films is disposed so that an electrode and a wiring provided for a pair of substrates respectively are electrically connected to each other. Alternatively, a conductive paste may be disposed in the conductive portion so that the electrode and the wiring provided for the pair of substrates respectively are electrically connected to each other. Further alternatively, a metal nanoparticle covered with an organic thin film may be disposed in the conductive portion, the pair of substrates may be attached to each other, and baking may be performed thereon so that the electrode and the wiring provided for the pair of substrates respectively are electrically connected to each other. Note that the grain size of the metal nanoparticle is greater than or equal to 1 nm and less than or equal to 200 nm. Further, the organic thin film covering the metal nanoparticle is formed of a conductive material and a surfactant that form a coordinate bond.

The first space (compartment) surrounded by the sealing material may be filled with an inert gas or may be a low-pressure space as long as airtightness can be secured. Alternatively, an insulating organic material or a material having conductivity may be used to fill the space. The organic material for filling the first space (compartment) is, typically, an organic material used as a medium for discharging a conductive particle into the first space (compartment) or an organic material with which the space between a sealing material and a conductive particle is filled.

As the material having the conductivity with which the first space (compartment) is filled, there is a conductive polymer. Because the viscosity of a conductive polymer is low, the first space (compartment) can be filled with the conductive polymer. In the case where the first space (compartment) is filled with the conductive polymer, electrical connection between the opposite electrode and the connection wiring in the conductive portion can be further ensured because the contact area becomes large.

The inner peripheral shape of the sealing material is an octagon because the number of conductive portions is four in this specification; however, the present invention is not limited to this, and the inner peripheral shape of the sealing material may be a polygon such as a pentagon or a hexagon, as well. By the provision of four conductive portions, electrical connection is ensured and durability can be improved because, even if the first substrate or the second substrate is deformed by external force, electrical connection can be obtained at, at least, one portion. In particular, in a liquid crystal display device including a flexible substrate, reliability can be improved.

Further, a plurality of first spaces (compartments) are formed inside the outer peripheral shape, near corners of the outer peripheral shape, and outside the inner peripheral shape of the sealing material. A corner which faces to the corner of the outer peripheral shape in each of the first spaces is formed using a plurality of sides of the sealing material by which liquid crystals and conductive portions are blocked out. Further, the angles of the corners which face to the corners of the outer peripheral shape in the first spaces are preferably more than 90° and less than 180°. The corners which face to the corners of the outer peripheral shape in the first spaces may have constant angles or may have different angles. That is, the shape of top surface of the first space (compartment) where a conductor is disposed is a polygon.

Further, the inner peripheral shape of the sealing material may be partially curved. In this case, the shape of top surface of the sealing material by which liquid crystals and conductive portions are blocked out is curved. That is, the shape of top surface of the first space (compartment) where each conductor is disposed is fan-like.

In such a case where the shape of top surface of the first space (compartment) is a polygon or fan-like and the corners which face to the corners of the outer peripheral shape in the first spaces have angles of more than 90° and less than 180°, the area of a plane surrounded by the inner periphery of the sealing material is decreased, and therefore, usage of liquid crystals can be reduced. Further, the area of contact between a sealing material and liquid crystals can be reduced, and therefore, the amount of impurity diffusion from the sealing material into the liquid crystals can be reduced.

Further, a third space may be provided between the first space (compartment) having a conductive particle and the second space (compartment) having a pixel region. By the provision of the third space (compartment) between the first space (compartment) and the second space (compartment) so that the first space (compartment) and the second space (compartment) are separated from each other, impurity penetration from the conductive particle to the liquid crystals can be prevented.

As for a sealing material having low viscosity, an ink-jet method is suitable for dropping the sealing material, and as for a sealing material having high viscosity, a dispensing method is suitable for dropping the sealing material.

When liquid crystals are dropped, liquid crystals are heated to decrease the viscosity and dropped by a dispensing method.

Further, there is no particular limitation on the foregoing liquid crystal display device, and a liquid crystal display device using TN liquid crystals, OCB liquid crystals, STN liquid crystals, VA liquid crystals, ECB liquid crystals, GH liquid crystals, polymer dispersed liquid crystals, discotic liquid crystals, or the like can also be used. Among them, a normally black liquid crystal panel, such as a transmissive liquid crystal display device utilizing a vertical alignment (VA) mode is preferable. Some examples are given as the vertical alignment mode. For example, an MVA (multi-domain vertical alignment) mode, a PVA (patterned vertical alignment) mode, and an ASV mode can be used. Specifically, one pixel is divided into a plurality of sub-pixels and a projecting portion is provided in a position of an opposite substrate, corresponding to the center of each sub-pixel, so that a multi-domain pixel is formed. Note that the projecting portion is provided for at least one of an opposite substrate and an element substrate. The projecting portion makes liquid crystal molecules align radially and improves controllability of the orientation.

Further, an electrode for driving liquid crystals, that is, a pixel electrode may have the shape of top surface to be comb-shaped or zigzag so that a direction in which voltage is applied may be diversified. Further, a multi-domain pixel may be formed utilizing photo-alignment.

As an active element connected to the pixel electrode, a two-terminal active element such as a diode, an MIM, or a varistor, or a three-terminal active element such as a TFT using an amorphous semiconductor film as an active layer, a TFT using a crystalline semiconductor film as an active layer, a TFT using an organic semiconductor material as an active layer, or a TFT using a metal oxide such as ZnO for an active layer can be used.

Since the area of contact between a sealing material and liquid crystals can be reduced, the amount of impurity diffusion from the sealing material into the liquid crystals can be reduced. Accordingly, a display defect of a liquid crystal display device can be reduced.

Further, impurity diffusion from the conductor into the liquid crystal layer can be prevented. Accordingly, a display defect of a liquid crystal display device can be reduced.

Further, since electrical connection can be performed surely through the conductor, quality improvement of a liquid crystal display device can be achieved. Further, a liquid crystal display device in which electrical connection through the conductor can be maintained even if the substrate is deformed by application of external force such as a shock can be provided.

DETAILED DESCRIPTION OF THE INVENTION

Figure 1A:
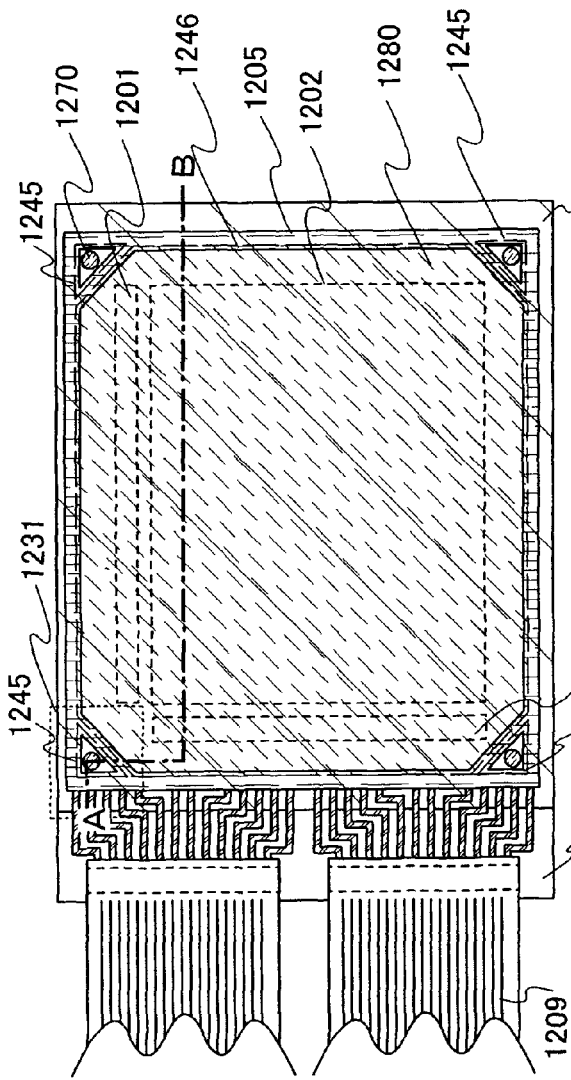
FIGS. 1A and 1B are a top view and a cross-sectional view describing a liquid crystal display device of the present invention.

Although the present invention will be fully described by way of embodiment modes with reference to the accompanying drawings, it is to be understood that various changes and modifications will be apparent to those skilled in the art. Therefore, unless such changes and modifications depart from the scope of the present invention, they should be construed as being included therein. In structures of the present invention described below, reference numerals are used in common through the drawings.

Embodiment Mode 1

In this embodiment mode, a liquid crystal display device of the present invention will be described with reference to FIGS. 1A and 1B and FIGS. 2A to 2F.

FIG. 1A is a top view of a liquid crystal display device of the present invention. A first substrate 1210 which serves as an active matrix substrate, provided with pixel electrodes and a second substrate 1204 provided with an opposite substrate are attached to each other with a first sealing material 1205, and the interior space surrounded by the first sealing material 1205 is filled with a liquid crystal 1280. A signal line driver circuit 1200, a scanning line driver circuit 1201, and a pixel region 1202 in which pixel electrodes are formed in a matrix form are formed over the first substrate 1210.

The first sealing material 1205 is also provided between the liquid crystal 1280 and a conductive particle 1270 which electrically connects a connection wiring provided for the first substrate 1210 and the opposite electrode provided for the second substrate 1204 to each other, so that the conductive particle 1270 and the liquid crystal 1280 are blocked out. That is, the shape of top surface of the first sealing material 1205 is a shape in which a plurality of circular shapes are combined. Further, the largest circular (outer peripheral) shape thereof includes a first space (compartment) and a second space (compartment) and is a rectangle in FIG. 1A. Further, the first sealing material by which a first space (compartment) 1245 where the conductive particle is disposed and the first sealing material by which a second space (compartment) 1246 where the pixel region is disposed are continuous. In addition, an FPC 1209 is attached to the first substrate 1210.

The inner peripheral shape of the sealing material is an octagon because the number of conductive portions each in which the conductive particle 1270 is disposed, i.e., the number of the first spaces (compartments) 1245 is four in FIG. 1A; however, the present invention is not limited to this, and the number of conductive portions may be any of 1 to 3 so that the inner peripheral shape of the sealing material is a pentagon, a hexagon, or the like, as well. By the provision of four conductive portions, electrical connection is ensured and durability can be improved because, even if the substrate is deformed by external force, electrical connection can be obtained at, at least, one portion. In particular, in a liquid crystal display device including a flexible substrate, reliability can be improved.

In FIG. 1A, the shape of the first sealing material by which the first space (compartment) 1245 where the conductive particle is disposed is blocked out is a triangle. That is, a compartment that is linear with respect to external angles of the first sealing material is formed. Further, the first sealing material by which the first space (compartment) and the second space (compartment) are blocked out is at an acute angle to one side of the first substrate and one side of the second substrate, which are parallel to each other, or the first sealing material formed along the one side of each of the first substrate and the second substrate.

Note that the shape of the first space (compartment) 1245 is not limited to a triangle. Enlarged top views in the vicinity of the first space (compartment) 1245 in FIG. 1A are shown in FIGS. 2A to 2F.

Figure 2A:
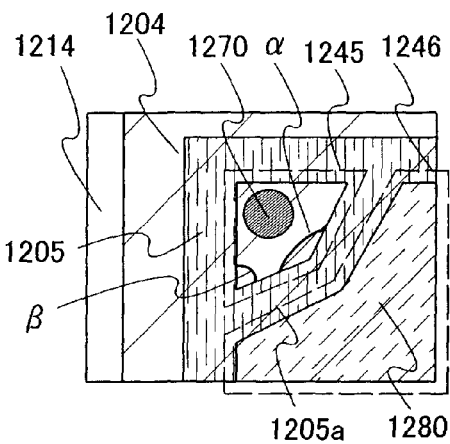
FIGS. 2A to 2F are top views each describing a liquid crystal display device of the present invention.

As shown in FIG. 2A, the shape of the first space (compartment) 1245 may be a polygon having four or more angles, such as a quadrangle. Shown in FIG. 2A is a mode in which the shape of the first space (compartment) 1245 is a quadrangle. In this case, a first sealing material 1205a by which the first space (compartment) 1245 and the second space (compartment) 1246 are blocked out has two sides, the two sides are at an angle α to each other, and it is preferable that the angle α be more than 90° and less than 180°. Note that an angle β, which is an angle between the first sealing material by which the first space (compartment) and the second space (compartment) are blocked out and one side of the first substrate and one side of the second substrate, which are parallel to each other, on the side where the first space (compartment) is formed, is acute. That is, the angle β, which is made with the first sealing material by which the first space (compartment) and the second space (compartment) are blocked out and the first sealing material formed along the one side of each of the first substrate and the second substrate, on the side where the first space (compartment) is formed, is acute.

Figure 2B:
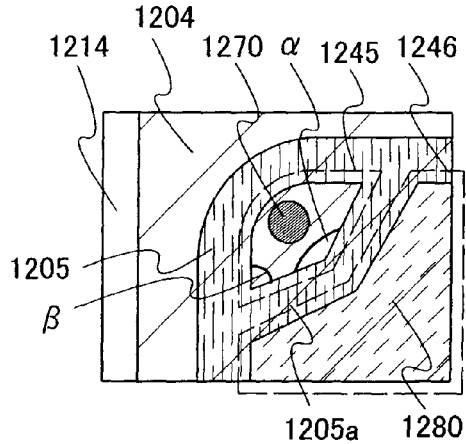

Further, a corner of the first space may be curved like that shown in FIG. 2B. In this case, the shape of the first space (compartment) 1245 is fan-like. Further, the angle β, which is an angle between the first sealing material by which the first space (compartment) and the second space (compartment) are blocked out and one side of the first substrate and one side of the second substrate, which are parallel to each other, on the side where the first space (compartment) is formed, is acute.

Figure 2C:
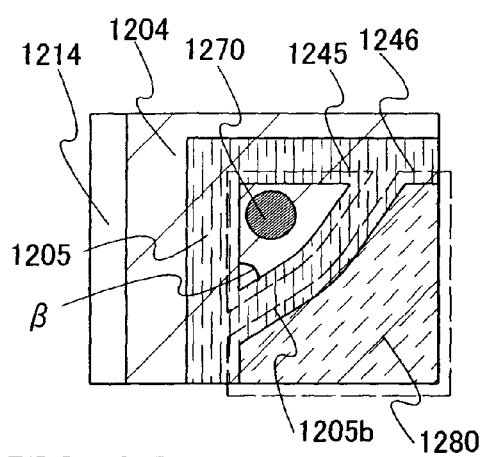

Further, as shown in FIG. 2C, the shape of the first space (compartment) 1245 may be fan-like. At this time, a first sealing material 1205b by which the first space (compartment) 1245 and the second space (compartment) 1246 are blocked out is curved. Note that, although the first sealing material 1205b by which the first space (compartment) 1245 and the second space (compartment) 1246 are blocked out is curved so as to be concave with respect to a corner of the first space in this embodiment mode, it may be curved so as to be convex as well. Note that the angle β, which is an angle between the first sealing material by which the first space (compartment) and the second space (compartment) are blocked out and one side of the first substrate and one side of the second substrate, which are parallel top each other, on the side where the first space (compartment) is formed, is acute. That is, the angle β, which is made with the first sealing material by which the first space (compartment) and the second space (compartment) are blocked out and the first sealing material formed along the one side of each of the first substrate and the second substrate, on the side where the first space (compartment) is formed, is acute.

Figure 2D:
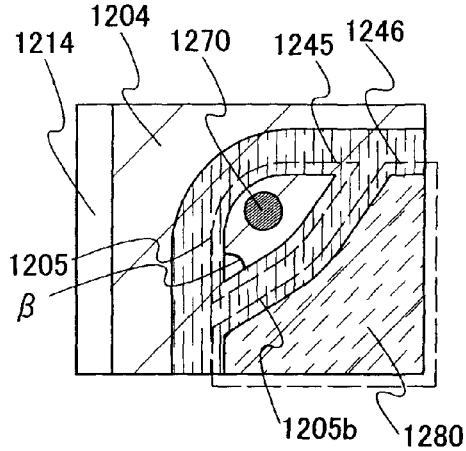

Further, a corner of the first space may be curved like that shown in FIG. 2D. In this case, the first space (compartment) 1245 is surrounded by a curve. Further, the angle β, which is an angle between the first sealing material by which the first space (compartment) and the second space (compartment) are blocked out and one side of the first substrate and one side of the second substrate, which are parallel to each other, on the side where the first space (compartment) is formed, is acute.

In such a case where the shape of top surface of the first space (compartment) 1245 is a polygon or fan-like with an external angle between the second space (compartment) 1246, of more than 90° and less than 180°, the area of a plane surrounded by the inner periphery of the sealing material is decreased, and therefore, usage of liquid crystals can be reduced. Further, the area of contact between a sealing material and liquid crystals can be reduced.

Figure 2E:
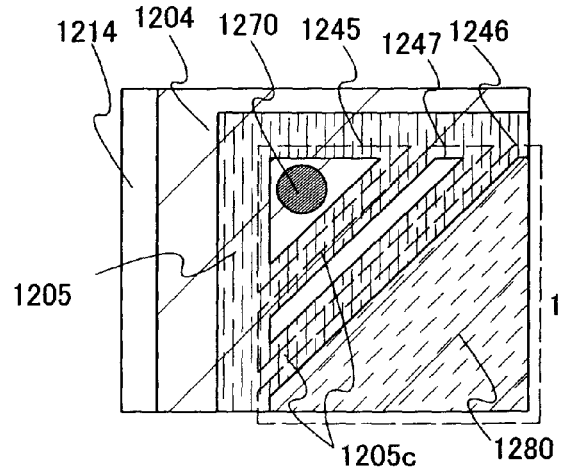

Further, as shown in FIG. 2E, a third space 1247 may be provided between the first space (compartment) 1245 having a conductive particle and the second space (compartment) 1246 having a pixel region. That is, a plurality of first sealing materials 1205c by which the first space (compartment) 1245 and the second space (compartment) 1246 are blocked out may be provided to form the third space by using the first sealing materials 1205c. Note that, although the first sealing material 1205c by which the first space (compartment) 1245 and the second space (compartment) 1246 are blocked out is doubled to provide the third space 1247 between the first space (compartment) 1245 and the second space (compartment) 1246 in this embodiment mode, more than two first sealing materials 1205c may be provided to provide a plurality of spaces between the first space (compartment) 1245 and the second space (compartment) 1246, as well. By separating the first space (compartment) 1245 and the second space (compartment) 1246 from each other as described above, impurity penetration from the conductive particle to the liquid crystals can be prevented.

Figure 2F:
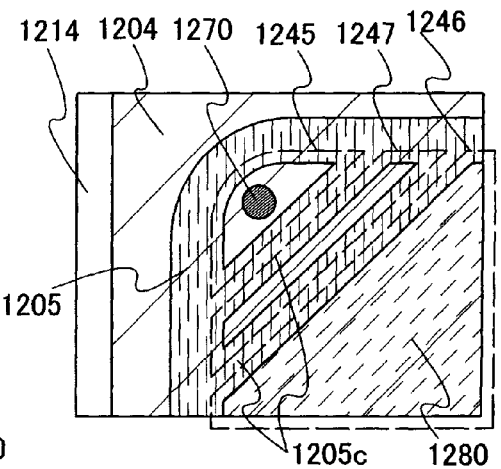

Further, the corner of the first space may be curved like that shown in FIG. 2F. In this case, the shape of the first space (compartment) 1245 is fan-like.

Furthermore, in the case where a plurality of the first spaces (compartments) 1245 exists, a plurality of the shapes of the first space (compartment) selected among those shown in FIG. 1A, and FIGS. 2A to 2F may be combined to form the first spaces (compartments) 1245.

The first sealing material 1205 is applied over the first substrate or the second substrate by a screen printing method, or with an ink-jet apparatus or a dispensing apparatus. As the first sealing material 1205, typically, a material containing a visible light curable resin, an ultraviolet curable resin, or a thermosetting resin can be used. For example, an epoxy resin such as a liquid bisphenol-A resin, a solid bisphenol-A resin, an epoxy bromine-containing resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. As the first sealing material 1205, a material having a viscosity in the range of 40 Pa·s to 400 Pa·s is used. Further, a filler (1 μm to 24 μm in diameter) may be contained. Note that it is preferable to select as the first sealing material, a sealing material which is insoluble in liquid crystals which are in contact with the first sealing material later.

As the conductive particle 1270, a conductive particle in which an insulating sphere 1232 is covered with metal thin films 1233 and 1234 can be used. The insulating sphere 1232 is formed of silica glass, hard resin, or the like. Each of the metal thin films 1233 and 1234 can be formed of a single layer or a stack of a plurality of layers of gold, silver, palladium, nickel, ITO, and/or IZO. For example, as each metal thin film, a gold thin film, a stack of a nickel thin film and a gold thin film, or the like can be used. By using the conductive particle 1270 in which the insulating sphere 1232 is contained at the center, elasticity can be improved so that destruction due to external pressure can be reduced.

Figure 3:
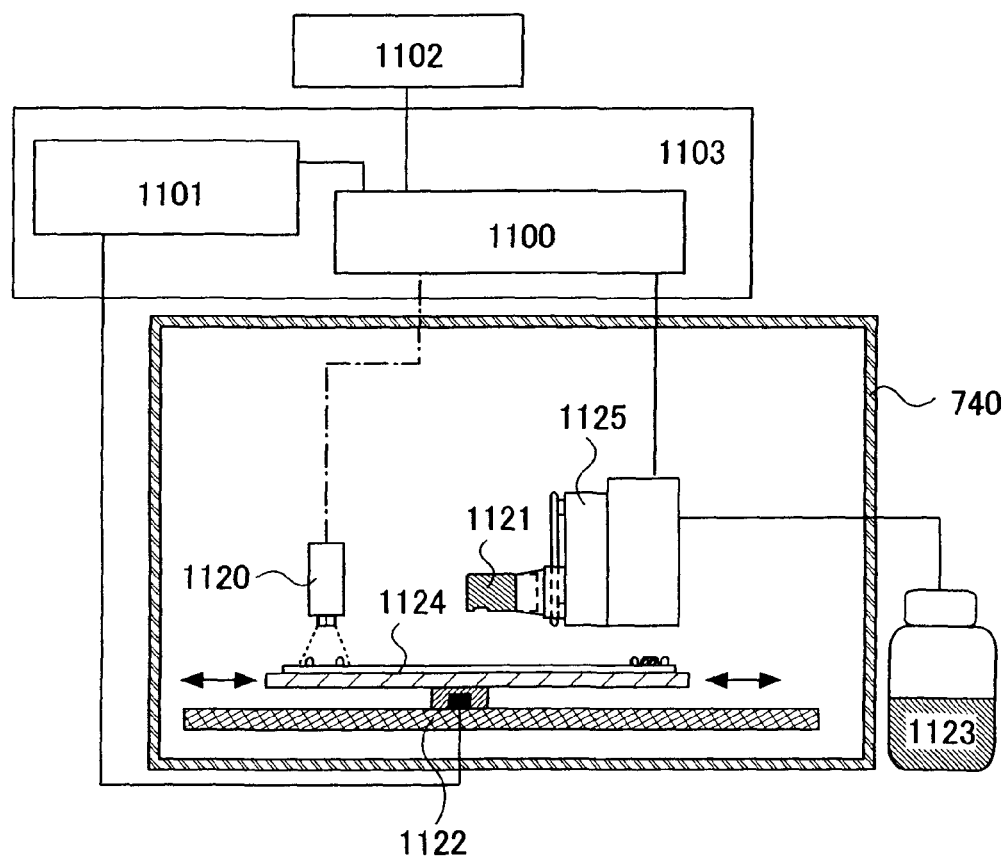
FIG. 3 is a diagram describing an ink-jet apparatus which can be used for the present invention.

Here, a method of applying the first sealing material and the conductive particle by using an inkjet method is described using FIG. 3. FIG. 3 shows one example of a cross section of a droplet discharge apparatus. The droplet discharge apparatus shown in FIG. 3 includes a droplet discharge means 1125 provided with a head with a plurality of nozzles arranged in one axial direction, a control portion 1103 for controlling the droplet discharge means 1125, a stage 1122 that fixes a substrate 1124 and moves in X, Y, and a directions, and the like. This stage 1122 also has a function for fixing the substrate 1124 by a technique such as vacuum chuck. A composition is discharged to the substrate 1124 from a discharging outlet of each nozzle included in the droplet discharge means 1125 so that the first sealing material and the conductive particle are applied.

The stage 1122 and the droplet discharge means 1125 are controlled by the control portion 1103. The control portion 1103 includes a stage position control portion 1101. An imaging means 1120 such as a CCD camera is also controlled by the control portion 1103. The imaging means 1120 detects the position of a marker, and supplies the detected information to the control portion 1103. Further, the detected information can also be displayed on a monitor 1102. Furthermore, the control portion 1103 includes an alignment position control portion 1100. The composition including the first sealing material or the conductive particle is supplied from an ink bottle 1123 to the droplet discharge means 1125.

Note that, in applying the first sealing material or the conductive particle, the droplet discharge means 1125 may be moved or the stage 1122 may be moved while the droplet discharge means 1125 is fixed. In the case where the droplet discharge means 1125 is moved, however, acceleration of the composition, the distance between the nozzles provided for the droplet discharge means 1125 and an object to be processed, and the environment need to be considered.

Furthermore, although not shown, a movement mechanism in which the head moves up and down, a control means thereof, and/or the like may be provided as an accompanying structure in order to improve the accuracy of landing of the discharged component. By doing so, the distance between the head and the substrate 1124 can be varied depending on the properties of the composition to be discharged. Further, a gas supply means and a shower head may be provided. By doing so, the atmosphere can be substituted for an atmosphere of the same gas as a solvent of the composition so that desiccation can be prevented to some extent. Further, a clean unit or the like for supplying clean air to reduce dust in a work area may be provided. Further, although not shown, a means for measuring various values of physical properties such as temperature, pressure, and the like may be provided as well as means for heating a substrate, as necessary. These means can be collectively controlled by the control means provided outside a chassis. Furthermore, if the control means is connected to a manufacturing management system or the like through a LAN cable, a wireless LAN, an optical fiber, or the like, the process can be uniformly managed from the outside, which leads to improvement in productivity. Note that vacuum exhaust may be performed and the droplet discharge apparatus may be operated in a reduced pressure in order to hasten desiccation of the landed composition and to remove a solvent component of the composition.

Figure 1B:
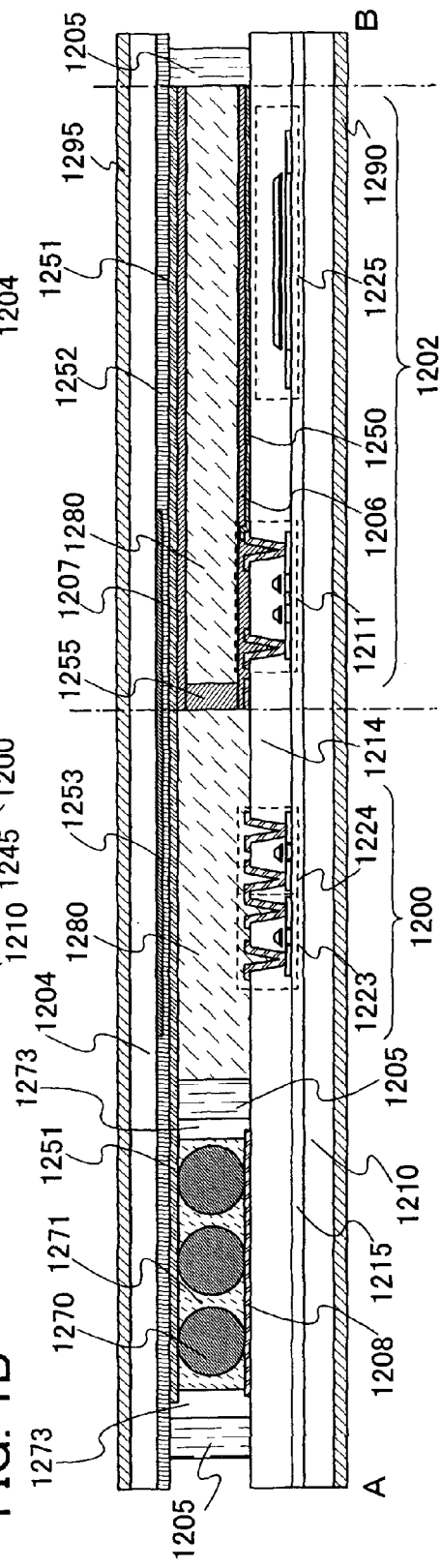

FIG. 1B is a cross-sectional view along a line A-B of FIG. 1A. The signal line driver circuit 1200 having a CMOS circuit including an n-channel TFF 1223 and a p-channel TFT 1224 is shown. Note that the signal line driver circuit 1200 or the scanning line driver circuit 1201 shown in FIG. 1A may be formed of a CMOS circuit, a PMOS circuit, or an NMOS circuit.

The pixel region 1202 includes a switching TFT 1211 and a capacitor 1225. Further, a pixel electrode 1250 which is connected to the switching TFT 1211 is formed over an insulating layer 1214.

As each of the first substrate 1210 and the second substrate 1204, any glass substrate used in the electronics industry, called a non-alkali glass substrate, such as an aluminosilicate glass substrate, an aluminoborosilicate glass substrate, or a barium borosilicate glass substrate, a quartz substrate, a ceramic substrate, a plastic substrate, or the like can be used as appropriate. By using a flexible plastic substrate as each of the first substrate 1210 and the second substrate 1204, a flexible liquid crystal display device can be manufactured.

The switching TFT 1211, the n-channel TFT 1223, the p-channel TFT 1224, and the capacitor 1225 are formed over the first substrate 1210 with an insulating layer 1215 interposed therebetween. An insulating layer which functions as a base film is formed as the insulating layer 1215; a single layer or a stack of a plurality of layers of silicon nitride oxide, silicon oxynitride, silicon oxide, and/or silicon nitride is used.

Each of the switching TFT 1211, the n-channel TFT 1223, and the p-channel TFT 1224 includes a semiconductor layer including a source region, a drain region, and a channel region, a gate insulating layer, and a gate electrode.

The semiconductor layer is a layer formed of a non-single crystal semiconductor or a single crystal semiconductor to be greater than or equal to 10 nm and less than or equal to 100 nm, more preferably greater than or equal to 20 nm and less than or equal to 70 nm. As a non-single crystal semiconductor layer, a crystalline semiconductor layer, an amorphous semiconductor layer, a microcrystalline semiconductor layer, or the like can be given. As a semiconductor, silicon, germanium, a compound of silicon and germanium, or the like can be given. In particular, it is preferable to apply a crystalline semiconductor which is formed by crystallization through rapid thermal annealing (RTA) or thermal treatment using an annealing furnace, or a crystalline semiconductor which is formed by crystallization through heat treatment and laser beam irradiation. In the heat treatment, a crystallization method using a metal element such as nickel which has an effect of promoting crystallization of a silicon semiconductor can be applied.

In the case of performing crystallization by laser light irradiation in addition to heat treatment, crystallization can be performed by continuously moving a melted zone of the crystalline semiconductor, which is melted by irradiation with a continuous wave laser beam or a high-repetition-rate ultrashort pulsed laser beam having a repetition rate of 10 MHz or higher and a pulse width of 1 nanosecond or shorter, preferably in the range of 1 to 100 picoseconds, in the laser beam irradiation direction. By such a crystallization method, a crystalline semiconductor having crystal grains which have a large grain size and have a grain boundary grown in one direction can be obtained.

Further, in the case where the semiconductor layer is formed of a single crystal semiconductor, a single crystal semiconductor substrate where a silicon oxide layer is formed is attached to the first substrate 1210 and part of the single crystal semiconductor substrate is polished or separated, thereby a semiconductor layer using a single crystal semiconductor can be formed over the first substrate 1210.

The gate insulating layer is formed of an inorganic insulator such as silicon oxide or silicon oxynitride with a thickness greater than or equal to 5 nm and less than or equal to 50 nm, preferably greater than or equal to 10 nm and less than or equal to 40 nm.

The gate electrode can be formed of a metal or a polycrystalline semiconductor to which impurities having one conductivity type are added. In the case of using a metal, tungsten (W), molybdenum (Mo), titanium (Ti), tantalum (Ta), aluminum (Al), or the like can be used. Further, a metal nitride which is obtained by nitriding a metal can be used, as well. Further alternatively, the gate electrode may have a stacked-layer structure of a first layer formed of the metal nitride and a second layer formed of the metal. In this case, by using a metal nitride as the first layer, the function as a barrier metal can be obtained. That is, the metal of the second layer can be prevented from diffusing into the gate insulating layer or the semiconductor layer below the gate insulating layer. Furthermore, in the case of employing a stacked-layer structure, the gate electrode may have a shape in which the edge of the first layer extends beyond the edge of the second layer.

Each of the switching TFT 1211, the n-channel TFT 1223, and the p-channel TFT 1224 which is formed by combination of the semiconductor layer, the gate insulating layer, the gate electrode, and/or the like can have various structures such as a single drain structure, an LDD (Lightly Doped Drain) structure, and a gate overlapped drain structure. In this embodiment mode, a thin film transistor with an LDD structure is described. Alternatively, a multigate structure where transistors, to which gate voltage having the same potential in terms of equivalence is applied, are connected in series, a dual gate structure where a semiconductor layer is interposed between gate electrodes, an inverted staggered structure, or the like can be employed.

Each wiring which is in contact with the source region or drain region of the semiconductor layer is preferably formed by combination of a low-resistance material such as aluminum (Al) and a barrier metal using a high-melting-point metal material such as titanium (Ti) or molybdenum (Mo), e.g., a stacked-layer structure of titanium (Ti) and aluminum (Al) or a stacked-layer structure of molybdenum (Mo) and aluminum (Al).

As the thin film transistor, a thin film transistor using a metal oxide or an organic semiconductor material for a semiconductor layer can be used. As typical examples of the metal oxide, zinc oxide, an oxide of zinc gallium indium, and the like can be given.

The capacitor 1225 includes a semiconductor layer to which impurities are added and a gate insulating layer interposed between gate electrodes. The insulating layer 1214 is provided over the n-channel TFT 1223, the p-channel TFT 1224, the switching TFT 1211, and the capacitor 1225 so as to cover them. A pixel electrode 1250 which is connected to one electrode of the switching TFT 1211 is formed over the insulating layer 1214. Further, a connection wiring 1208 which is connected to an opposite electrode via the conductive particle 1270 is formed over the insulating layer 1214. Further, the connection wiring 1208 is connected to the FPC 1209, though not shown. Many layers of the connection wiring 1208 and the insulating layer 1214 may be provided depending on the structure of the pixel region, the signal line driver circuit, or the scanning line driver circuit. In such a case, the signal line driver circuit or the scanning line driver circuit can be formed with a smaller area, so that the area of the pixel region can be increased.

The kind of the pixel electrode 1250 is different in a transmissive liquid crystal display device and a reflective liquid crystal display device. In the case of a transmissive liquid crystal display device, the pixel electrode 1250 is formed of a light-transmitting material. As examples of the light-transmitting material, indium tin oxide (ITO), zinc oxide (ZnO), indium zinc oxide (IZO), gallium-doped zinc oxide (GZO), and the like can be given.

Further, the pixel electrode 1250 can be formed of a conductive composition including a conductive polymer, as well. The pixel electrode 1250 formed of the conductive composition has preferably a sheet resistance which is equal to or less than 10000 $\Omega$/squar and a transmittance which is greater than or equal to 70% at a wavelength of 550 nm. Further, the resistance of the conductive polymer included in the conductive composition is preferably equal to or less than 0.1 $\Omega\cdot$cm.

As the conductive polymer, a so-called $\pi$-electron conjugated conductive polymer can be used. As examples thereof, polyaniline or a derivative thereof, polypyrrole or a derivative thereof, polythiophene or a derivative thereof, a copolymer of more than two kinds of them, and the like can be given.

As specific examples of a conjugated conductive polymer, the following can be given: polypyrrole; poly(3-methylpyrrole); poly(3-butylpyrrole); poly(3-octylpyrrole); poly(3-decylpyrrole); poly(3-dimethylpyrrole); poly(3,4-dibutylpyrrole); poly(3-hydroxypyrrole); poly(3-methyl-4-hydroxypyrrole); poly(3-methoxypyrrole); poly(3-ethoxypyrrole); poly(3-ethoxypyrrole); poly(3-octoxypyrrole); poly(3-carboxypyrrole); poly(3-methyl-4-carboxypyrrole); poly(N-methylpyrrole); polythiophene; poly(3-methylthiophene); poly(3-butylthiophene); poly(3-octylthiophene); poly(3-decylthiophene); poly(3-dodecylthiophene); poly(3-methoxythiophene); poly(3-ethoxythiophene); poly(3-octoxythiophene); poly(3-carboxythiophene); poly(3-methyl-4-carboxythiophene); poly(3,4-ethylenedioxythiophene); polyaniline; poly(2-methylaniline); poly(2-octylaniline); poly(2-isobutylaniline); poly(3-isobutylaniline); poly(2-aniline sulfonic acid); poly(3-aniline sulfonic acid); and the like.

The above-described conductive polymer may be singly used as the conductive composition to form the pixel electrode. Further, in order to control the film properties such as film quality or film strength of the pixel electrode formed of the conductive composition, an organic resin can be added into the conductive polymer in the conductive composition.

As the organic resin, a light-curable resin, a heat-flexible resin, a curable resin which is compatible with or capable of mixed dispersion with the conductive polymer, or the like can be used. For example, the following can be given: a polyester resin such as polyethylene terephthalate, polybutylene terephthalate, or polyethylenenaphthalate; a polyimide resin such as polyimide or polyamide-imide; a polyamide resin such as polyamide 6, polyamide 6,6, polyamide 12, or polyamide 11; a fluorine resin such as polyvinylidene fluoride, polyvinyl fluoride, polytetrafluoroethylene, ethylene tetrafluoro ethylene copolymer, or polychlorotrifluoroethylene; a vinyl resin such as polyvinyl alcohol, poly vinyl ether, polyvinylbutyral, polyvinyl acetate, or polyvinyl chloride; an epoxy resin; a xylene resin; an aramid resin; a polyurethane resin; a melamine resin; a phenol resin; polyether; an acrylic resin; a copolymer thereof; and the like.

Furthermore, in order to control the electrical conductivity of the conductive composition, the redox potential of a conjugated electron of the conjugated conductive polymer may be changed by adding an acceptor dopant or a donor dopant into the conductive composition.

As the acceptor dopant, a halogen compound, Lewis acid, proton acid, an organic cyano compound, an organometallic compound, or the like can be used. As examples of the halogen compound, chlorine, bromine, iodine, iodine chloride, iodine bromide, iodine fluoride, and the like can be given. As examples of the Lewis acid, phosphorus pentafluoride, arsenic pentafluoride, antimony pentafluoride, boron trifluoride, boron trichloride, boron tribromide, and the like can be given. As examples of the proton acid, inorganic acid such as hydrochloric acid, sulfuric acid, nitric acid, phosphoric acid, fluoroboric acid, hydrofluoric acid, and perchloric acid and organic acid such as organic carboxylic acid and organic sulfonic acid can be given. As each of the organic carboxylic acid and the organic sulfonic acid, acidum benzoicum, acetic acid, phthalic acid, p-toluenesulphonic acid, naphthalenesulphonic acid, alkylnaphthalenesulphonic acid, anthraquinonesulphonic acid, dodecylbenzenesulphonic acid, and the like can be given, and a metallic salt thereof can also be used. As the organic cyano compound, a compound in which two or more cyano groups are included in a conjugated bond can be used. For example, there are tetracyanoethylene, tetracyano ethylene oxide, tetracyanobenzene, tetracyano quinodimethan, tetracyano azanaphthalene, and the like.

As the donor dopant, there are alkali metal, alkaline-earth metal, a quaternary amine compound, and the like.

Further, a pixel electrode layer can be formed by a wet process using a solution in which the conductive composition is dissolved in water or an organic solvent (e.g., an alcohol solvent, a keton solvent, an ester solvent, a hydrocarbon solvent, or an aromatic solvent).

There is no particular limitation on the solvent in which the conductive composition is dissolved as long as the above-described conductive polymer and the polymeric resin compound such as an organic resin are dissolved. For example, the conductive composition may be dissolved in a single solvent or a mixed solvent of the following: water, methanol, ethanol, propylene carbonate, N-methylpyrrolidone, dimethylformamide, dimethylacetamide, cyclohexanone, acetone, methyl etyl ketone, methyl isobutyl ketone, toluene, and/or the like.

The conductive composition is applied over the insulating layer 1214 by a wet process such as an application method, a coating method, a droplet discharging method (also called an ink-jet method), or a printing method to form the pixel electrode 1250. In the case where the conductive composition includes the solvent, thermal treatment for drying the solvent may be performed or the conductive composition may be used under reduced pressure so that the pixel electrode is formed. Further, in the case where the organic resin included in the conductive composition is heat-curable, further heat treatment may be performed, whereas in the case where the organic resin included in the conductive composition is light-curable, light irradiation treatment may be performed, in order to harden the organic resin.

On the other hand, in the case of a reflective liquid crystal display device, a metal electrode having high reflectivity is used as the pixel electrode. Specifically, aluminum, silver, or the like is used. Further, the reflectivity is increased by making the surface of the pixel electrode rough. Therefore, a base film of the pixel electrode may be made rough.

Further, in the case of a semi-transmissive liquid crystal display device, both of a transmissive material and a reflective material are used for the pixel electrode.

Figure 4A:
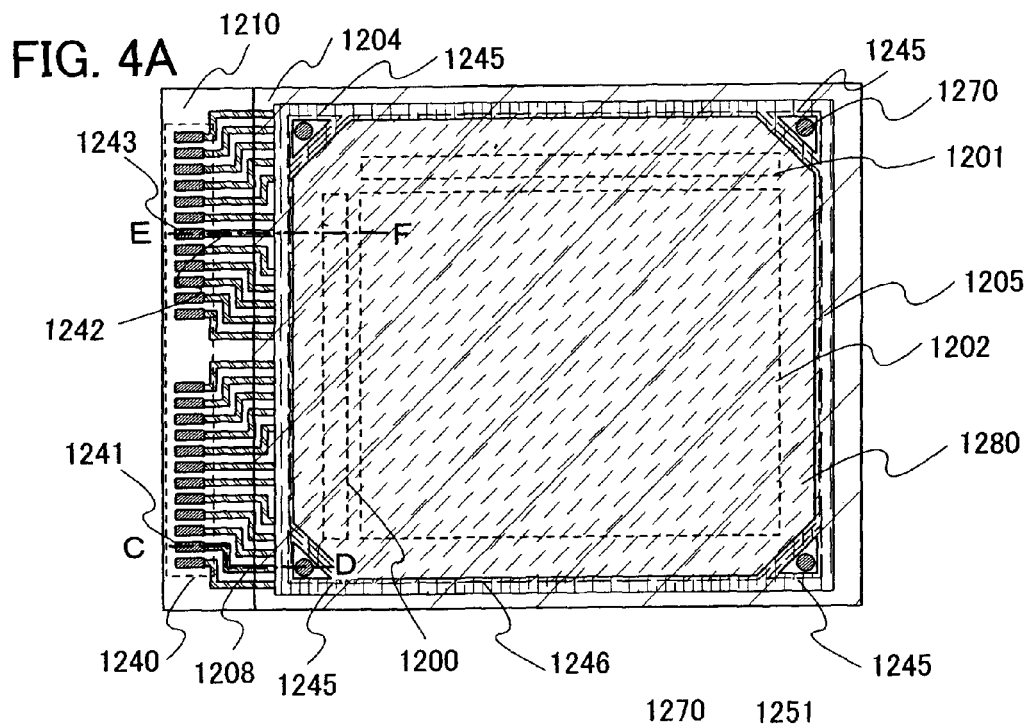
FIGS. 4A to 4C are a top view and cross-sectional views describing a liquid crystal display device of the present invention.
Figure 4B:
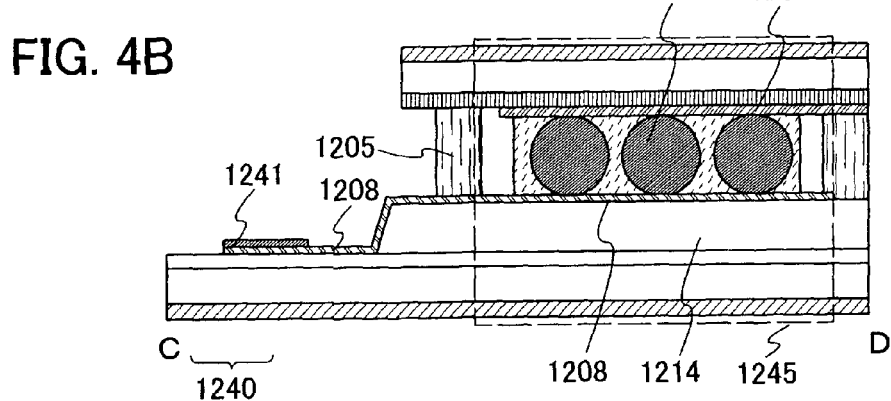
Figure 4C:
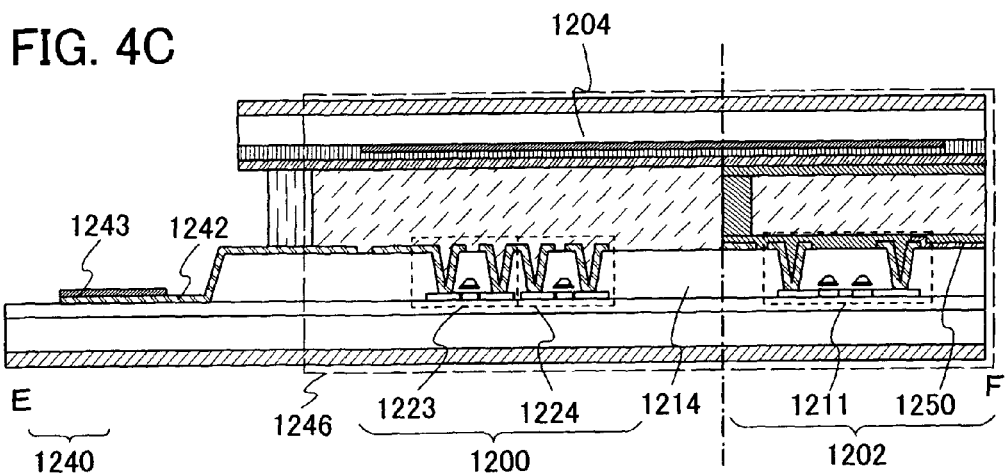

Here, a connection structure between the connection wiring and the conductive particle and a connection structure between the connection wiring and the pixel region are described using FIGS. 4A to 4C.

FIG. 4A is a top view of a liquid crystal display device before an FPC is attached to the first substrate 1210. FIG. 4B is a cross-sectional view taken along a line C-D of FIG. 4A, and shows a connection region between a conductive particle and a connection wiring. FIG. 4C is a cross-sectional view taken along a line E-F of FIG. 4A, and shows a connection region between a pixel region and a connection wiring.

As shown in FIG. 4A, the liquid crystal display device includes the first space (compartment) 1245 including the conductive particle 1270 and the second space (compartment) 1246 including a display region. The first space (compartment) 1245 is surrounded by the first substrate 1210, the second substrate 1204, and the first sealing material 1205, and the conductive particle 1270 is disposed in the first space (compartment) 1245. The second space (compartment) 1246 is surrounded by the first substrate 1210, the second substrate 1204, and the first sealing material 1205, and the pixel region 1202 is disposed in the second space (compartment) 1246.

Further, a terminal portion 1240 is formed in the end of the first substrate 1210. In the terminal portion 1240, a connection terminal is formed on the connection wiring.

FIG. 4B is a cross-sectional view of a region where the connection terminal and the conductive particle 1270 in the first space (compartment) 1245 are connected to each other. A connection wiring 1208 is formed over the insulating layer 1214. A connection terminal 1241 formed at the same time as the pixel electrode is formed over the connection wiring 1208. The connection terminal 1241 is electrically connected to an opposite electrode 1251 via the connection wiring 1208 and the conductive particle 1270. Further, the connection terminal 1241 is connected to an FPC.

FIG. 4C is a cross-sectional view of a region where the pixel electrode in the second space (compartment) 1246 and the connection terminal are connected to each other. A connection wiring 1242 is formed over the insulating layer 1214. A connection terminal 1243 formed at the same time as the pixel electrode 1250 is formed over the connection wiring 1242. The connection terminal 1243 is electrically connected to the pixel electrode 1250 via the connection wiring 1242. Note that, although the mode of an active matrix liquid crystal display device is described in this embodiment mode, the pixel electrode 1250 and the connection wiring 1242 are not directly connected but are connected via the switching TFT 1211 or the signal line driver circuit 1200.

Then, as shown in FIG. 1B, an alignment film 1206 is provided over the pixel electrode 1250, and rubbing is performed thereon. The alignment film 1206 and rubbing are not necessarily required, which depends on the mode of liquid crystals.

For the second substrate 1204 which serves as an opposite substrate, a black matrix 1253 is provided at a position overlapping the signal line driver circuit 1200, and a color filter and a protective layer 1252 are provided at a position overlapping at least the pixel region 1202. In the case where color display is performed by a color sequential method called field sequential, the color filter is not necessarily provided. The opposite electrode 1251 is provided for the color filter and the protective layer 1252, an alignment film 1207 is provided over the opposite electrode 1251, and rubbing is performed thereon. Similarly to the case of the first substrate 1210, as for the second substrate 1204, an alignment film and rubbing are not necessarily required, which depends on the mode of liquid crystals.

The second substrate 1204 provided with the opposite electrode 1251 or the first substrate 1210 provided with the pixel electrode 1250 is provided with a pillar spacer 1255. The pillar spacer 1255 is provided to keep a distance between the first substrate 1210 and the second substrate 1204. The pillar spacer is also called a photolitho spacer, a post spacer, a scallop spacer, or a column spacer; and in this embodiment mode, it is referred to as a pillar spacer. As for a method for forming the pillar spacer 1255, an organic insulating material such as photosensitive acrylic is applied to an entire surface of the substrate by a spin coating method, a series of photolithography steps is performed thereon, and photosensitive acrylic which remains over the substrate serves as a spacer. With this method, a place for disposing a spacer can be exposed in accordance with a mask pattern at the time of exposure; therefore, by disposing the pillar spacer at a portion where the liquid crystal does not drive, light of the liquid crystal can be prevented from leaking as well as the distance between the upper and lower substrates is maintained. Further, the pillar spacer 1255 can be formed by discharging a composition containing an organic insulating material by an ink-jet method and performing baking thereon.

Note that, although the pillar spacer 1255 is provided in the second space (compartment) 1246 where the opposite electrode 1251 is formed in this embodiment mode, the distance between the upper and lower substrates can be further maintained by provision of the pillar spacer 1255 also in the first space 1245.

The first sealing material 1205, the conductive particle 1270, and a second sealing material 1271 are provided between the first substrate 1210 and the second substrate 1204.

Here, the structure of a conductive portion, that is, a cross section of the first space (compartment) 1245 where the conductive particle 1270 is disposed is described using FIG. 1B and FIGS. 5A to 5D. FIGS. 5A to 5D are cross-sectional views each of a region 1231 in FIG. 1A.

As shown in FIG. 1B, the first space (compartment) includes the conductive particle 1270, the connection wiring 1208 and the opposite electrode 1251 which are connected to each other via the conductive particle 1270, and the second sealing material 1271 which covers the conductive particle 1270. Further, the first space (compartment) is surrounded by the first sealing material 1205. Further, a space 1273 is formed between the first sealing material 1205 and the second sealing material 1271. The space 1273 may be vacuum or may be filled with an inert gas or air. The second sealing material 1271 is a medium by which the conductive particle 1270 can be easily discharged in the space surrounded by the first sealing material 1205, and a medium for fixing the conductive particle 1270 after the first sealing material 1205 is hardened. The second sealing material 1271 can be formed of a similar material to the first sealing material 1205.

Modes which are different from the structure of the first space (compartment) shown in FIG. 1B are described using FIGS. 5A to 5D.

Figure 5A:
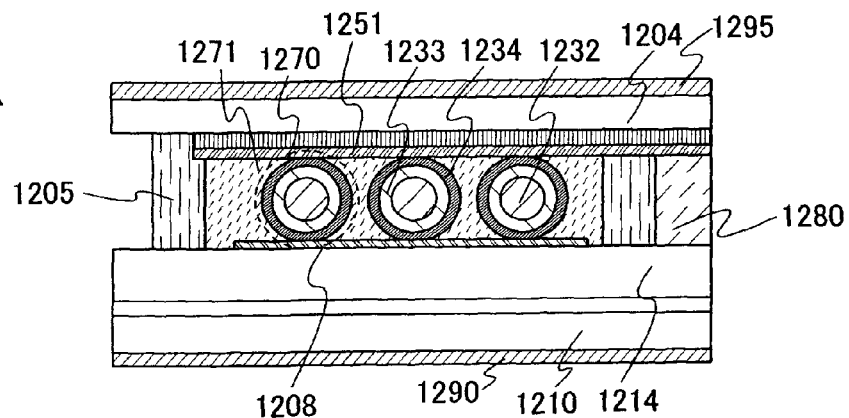
FIGS. 5A to 5D are cross-sectional views each describing a liquid crystal display device of the present invention.

As shown in FIG. 5A, a space does not necessarily exist between the first sealing material 1205 and the second sealing material 1271, and they may be in contact with each other. In this case, the first sealing material 1205 is applied, the conductive particle and the second sealing material 1271 are discharged, and then the first substrate 1210 and the second substrate 1204 are attached to each other. Note that, in the case where the first sealing material 1205 and the second sealing material 1271 are in contact with each other, materials which are not mixed with each other are selected for them as appropriate.

Figure 5B:
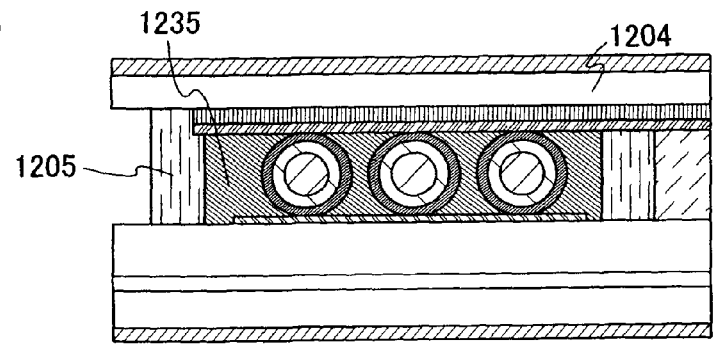

Further, as shown in FIG. 5B, the space around the conductive particle 1270 may be filled with a conductive polymer 1235. As typical examples of the conductive polymer 1235, conductive polyaniline, conductive polypyrrole, conductive polythiophen, a complex of poly(3,4-ethylenedioxythiophene) (PEDOT) and poly(styrenesulfonic acid) (PSS), and the like can be given. Further, any of the afore-mentioned examples of the conductive polymer which can be used for the pixel electrode 1250 can be used as appropriate, as well. The conductive polymer 1235 is formed by applying the conductive polymer with an ink-jet apparatus, a dispensing apparatus, or the like. In this case, the first sealing material 1205 is applied, the conductive polymer 1235 containing a conductive particle is discharged, and then the first substrate 1210 and the second substrate 1204 are attached to each other. Note that, although the structure in which the conductive polymer 1235 and the first sealing material 1205 are in contact with each other is shown in FIG. 5B, a space may be provided on the first substrate 1210 side or the second substrate 1204 side. That is, when the conductive polymer is in contact with at least the opposite electrode or the connection wiring, the conductive particle 1270 and the conductive polymer are in contact with the opposite electrode and the connection wiring, so that connection resistance between the opposite electrode and the connection wiring can be reduced.

Note that, as for the conductive particle 1270 shown in FIGS. 5A and 5B, by attaching the first substrate 1210 and the second substrate 1204 to each other with the first sealing material 1205 and hardening the first sealing material 1205 with UV light, the connection wiring 1208 provided for the first substrate 1210 is electrically connected to the opposite electrode 1251 provided for the second substrate 1204 via the conductive particle 1270.

Figure 5C:
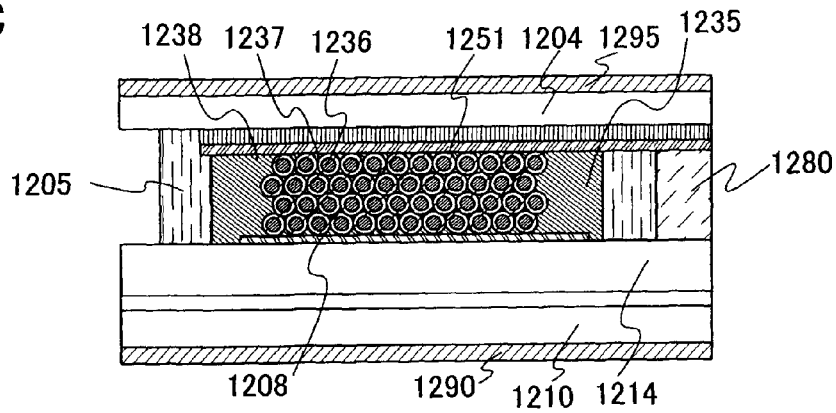
Figure 5D:
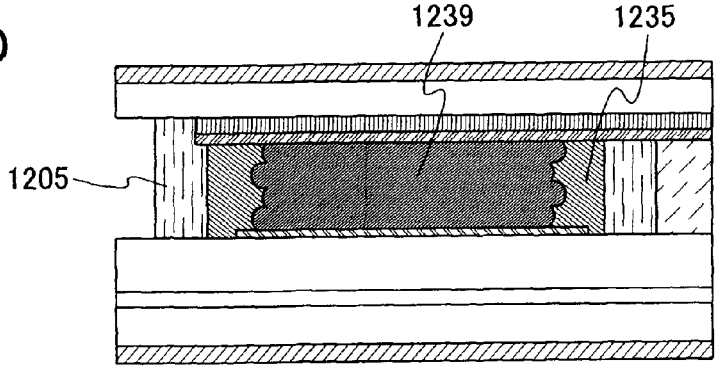

Further, as shown in FIG. 5C, the conductive particle 1270 may be formed of nanoparticles in each of which a conductive material 1236 is covered with an organic thin film 1237. As for the nanoparticles, the organic thin films are decomposed by heat treatment for hardening the first sealing material and realigning the orientation of liquid crystals after the first substrate 1210 and the second substrate 1204 are attached to each other, so that nanoparticles each of the conductive material are in contact and fused with one another, thereby a conductive particle 1239 can be formed as shown in FIG. 5D. In this case, the first sealing material 1205 is applied, the nanoparticles in each of which the conductive material 1236 is covered with the organic thin film 1237 are discharged, the conductive polymer 1235 is discharged to fill the space between the first sealing material 1205 and the nanoparticles, and then the first substrate 1210 and the second substrate 1204 are attached to each other. Note that the space between the conductive polymer 1235 and the first sealing material 1205 may be filled with an insulating material, as well. Further, a space may be provided on the first substrate 1210 side or the second substrate 1204 side.

The nanoparticles are dispersed by a droplet discharging method. A droplet discharging method is a method for forming a pattern by discharging droplets containing a predetermined substance through a fine opening. In this embodiment mode, a composition in which nanoparticles in each of which a conductive material is covered with an organic thin film are dispersed in a solvent, is discharged (jetted) as a droplet, and dried so that the solvent is evaporated.

As the conductive material included in each nanoparticle, a metal element selected from gold (Au), silver (Ag), platinum (Pt), nickel (Ni), copper (Cu), palladium (Pd), tantalum (Ta), iridium (Ir), rhodium (Rh), tungsten (W), aluminum (Al), and/or the like or an alloy material containing the element as a main component is used. Further, a metal sulfide of cadmium (Cd) or zinc (Zn), an oxide of iron (Fe), titanium (Ti), germanium (Ge), silicon (Si), zirconium (Zr), barium (Ba), or the like, or one or more silver halides may be mixed. In the case where two or more kinds of elements or compounds are used as a conductive material, there is no particular limitation on the mixed state thereof; for example, each of them may exist uniformly, or one of them may be concentrated in the core portion. Further, the nanoparticles may be materials having insulating properties in the inner part as long as surfaces of the nanoparticles are formed of conductive materials.

The grain diameter of each nanoparticle is greater than or equal to 1 nm and less than or equal to 200 nm, preferably greater than or equal to 1 nm and less than or equal to 100 nm, and grain diameters of the nanoparticles included in the discharge material are preferably uniform.

Note that, depending on the conductive material included in each nanoparticle, a void may be generated between the particles when a voltage is applied. This is because crystal growth of the conductive material proceeds very fast, and such void generation can be suppressed by setting a voltage to be applied to a liquid crystal display device to be low or using an alloy material for each nanoparticle. Consequently, a highly reliable liquid crystal display device can be provided.

The organic thin film covering each nanoparticle corresponds to a dispersant having a function of preventing the nanoparticles from aggregating in the solvent and of stably dispersing the particles. Therefore, a compound for forming the organic thin film is formed of a surfactant, a substance which can form a coordinate bond with a metal element contained in the conductive material, or the like. Here, as the substance forming a coordinate bond with a metal element, a substance having a lone electron-pair on an atom of nitrogen, sulfur, oxygen, or the like such as an amino group, a thiol group (—SH), a sulfanediyl group (—S—), a hydroxy group (—OH), an oxy group (—O—), a carboxyl group (—COOH), a cyano group (—CN), or the like can be given. For example, a hydroxyamine such as ethanolamine, an amine-based compound such as polyethyleneimine or polyvinylpyrrolidone, an alcohol such as polyvinyl alcohol, an alkanethiol, a dithiol, a glycol such as ethylene glycol, diethylene glycol, or polyethylene glycol, polyacrylic acid, carboxymethylcellulose, or the like can be used. Further, as the surfactant, for example, an anionic surfactant such as bis(2-ethylhexyl)sulfosuccinic acid or sodium dodecylbenzenesulfonate, a nonionic surfactant such as alkyl ester which is polyalkyl glycol or alkyl phenyl ether, a fluorosurfactant, a copolymer having polyethyleneimine and polyethylene oxide, or the like can be used. Note that the dispersants are preferably contained at 1.0 wt. % or more and 30 wt. % or less with respect to the nanoparticles because the viscosity of a discharge material becomes high if the dispersants are contained at more than 30 wt. %.

Such nanoparticles in each of which a conductive material is covered with an organic thin film are dispersed in a solvent and discharged. For the solvent, water or an organic solvent can be used, and the organic solvent is either a water-soluble organic solvent or a water-insoluble organic solvent. For example, as the water-soluble organic solvent, alcohol such as methanol, ethanol, propanol, butyl alcohol, glycerin, dipropylene glycol, or ethylene glycol, ketone such as acetone or methyl ethyl ketone, glycol ether such as ethylene glycol monomethyl ether, ethylene glycol monoethyl ether, ethylene glycol monobutyl ether, or diethylene glycol monobutyl ether, a water-soluble nitrogen-containing organic compound such as 2-pyrrolidone or N-methyl pyrrolidone, ethyl acetate, or the like can be given. Further, as the water-insoluble organic solvent, alkane such as octane, nonan, or decane, an aromatic such as cycloalkane, toluene, xylene, benzene, or dichlorobenzene, or the like can be given. Needless to say, the number of kinds of solvents used is not limited to one but a mixture of plural kinds of solvents can be used as long as phase separation does not occur between the solvents.

Note that, in the case where a plurality of first spaces (compartments) exist, a plurality of different structures of the first space (compartment) selected among those shown in FIGS. 5A to 5D may be combined in their respective conductive portions. That is, in first spaces of a liquid crystal display device, the structure of the conducive portion shown in FIG. 5A and the structure of the conductive portion shown in FIG. 5B may be employed; alternatively, the structure of the conductive portion shown in FIG. 5A and the structure of the conductive portion shown in FIG. 5C may be employed.

The first sealing material 1205 and the conductive particle 1270 are discharged over the first substrate 1210 or the second substrate 1204, and then liquid crystals are discharged in a space surrounded by the first sealing material 1205. After that, the first substrate 1210 and the second substrate 1204 are attached to each other in reduced pressure, UV light irradiation is performed thereon to harden the first sealing material 1205, and then heat treatment is performed thereon to further harden the first sealing material 1205, so that the first substrate 1210 and the second substrate 1204 are firmly fixed. In addition, the orientation of the liquid crystals is made uniform by the heat treatment.

Consequently, as shown in FIG. 1B, the first substrate 1210 and the second substrate 1204 can be attached to each other. It is necessary that the shape formed by application of the first sealing material 1205 is a closed loop where there is no disconnection as shown in FIG. 1A.

Then, the first substrate 1210 and the second substrate 1204 are cut in the shape of a panel. Furthermore, in order to improve the contrast, a first polarizing plate 1290 and a second polarizing plate 1295 are provided for the outsides of the first substrate 1210 and the second substrate 1204 respectively. Note that the first polarizing plate 1290 is not necessarily provided in the case of a reflective display device.

As described above, in the liquid crystal display device described in this embodiment mode, since the area of contact between a sealing material and liquid crystals can be reduced, the amount of impurity diffusion from the sealing material into the liquid crystals can be reduced. Accordingly, a display defect of a liquid crystal display device can be reduced.

Further, impurity diffusion from the conductor into the liquid crystal layer can be prevented. Accordingly, a display defect of a liquid crystal display device can be reduced.

Further, since electrical connection can be performed surely through the conductor, quality improvement of a liquid crystal display device can be achieved. Further, a liquid crystal display device in which electrical connection through the conductor can be maintained even if the substrate is deformed by application of external force such as a shock can be provided.

Embodiment Mode 2

According to the present invention, various electronic appliances can be formed. As examples of such an electronic appliance, the following can be given: a camera such as a video camera or a digital camera, a navigation system, a sound reproducing device (e.g., a car audio or a car audio component), a computer, a game machine, a portable information terminal (e.g., a laptop computer, a mobile phone, a portable game machine, or an electronic book), an image reproducing device provided with a storage medium (specifically, a device for reproducing the content of a storage medium such as a DVD (Digital Versatile Disc) and having a display for displaying the image), and the like.

Figure 6A:
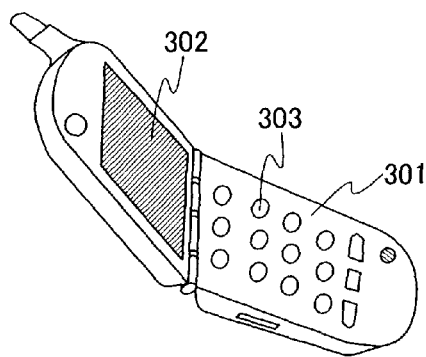
FIGS. 6A to 6E are views illustrating examples of an electronic device.

FIG. 6A illustrates one example of a mobile phone 301. This mobile phone 301 includes a display portion 302, operating portions 303, and the like. By applying the liquid crystal display device described in Embodiment Mode 1 to the display portion 302, a display portion with less display spots and high image quality can be formed.

Figure 6B:
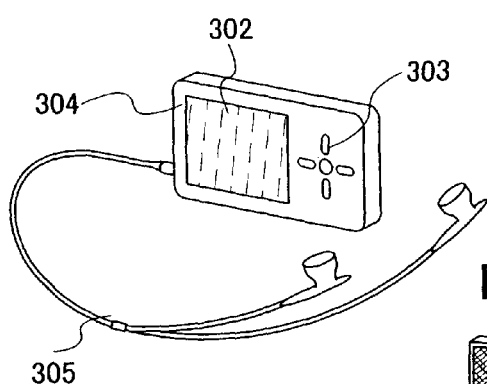

Further, FIG. 6B illustrates a digital player 304, which is a typical example of an audio device. The digital player 304 illustrated in FIG. 6B includes a display portion 302, operating portions 303, earphones 305, and the like. Note that headphones or wireless earphones can also be used instead of the earphones 305. Reduction in size and weight of the digital player 304 having the above-described structure can be realized. By applying the liquid crystal display device described in Embodiment Mode 1 to the display portion 302, a display portion with less display spots and high image quality can be formed.

Figure 6C:
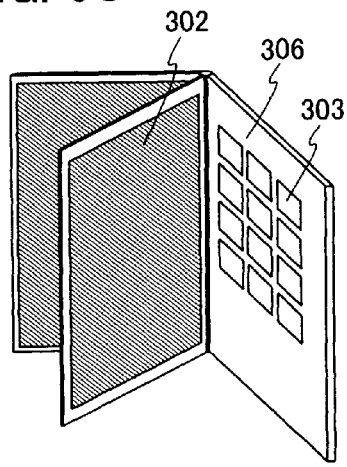

FIG. 6C illustrates an electronic book 306. This electronic book 306 includes a display portion 302, operating portions 303, and the like. Further, a modem may be built in, or a structure in which data can be transmitted and received wirelessly may be employed. By applying the liquid crystal display device described in Embodiment Mode 1 to the display portion 302, a display portion with less display spots and high image quality can be formed.

Figure 6D:
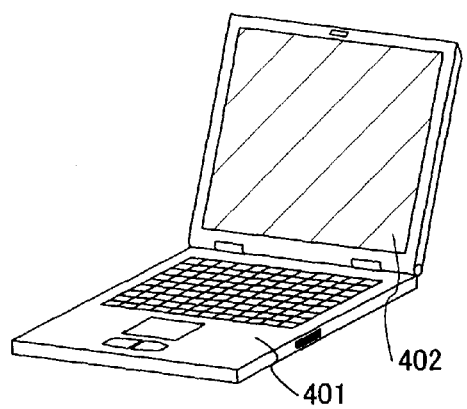

FIG. 6D illustrates a laptop computer which includes a main body 401, a display portion 402, and the like. By applying the liquid crystal display device described in Embodiment Mode 1 to the display portion 402, a display portion with less display spots and high image quality can be formed.

Figure 6E:
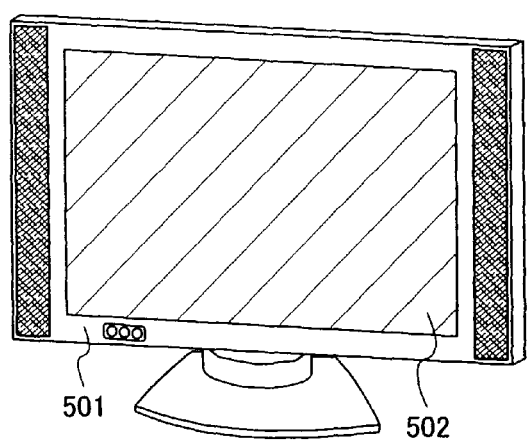

FIG. 6E illustrates a television which includes a main body 501, a display portion 502, and the like. By applying the liquid crystal display device described in Embodiment Mode 1 to the display portion 502, a display portion with less display spots and high image quality can be formed.

This application is based on Japanese Patent Application Serial No. 2007-132591 filed with Japan Patent Office on May 18, 2007, the entire contents of which are hereby incorporated by reference.

What is claimed is:

1. A liquid crystal display device comprising:
   a pixel electrode and a connection wiring which are formed over a first substrate;
   an opposite electrode formed over a second substrate;
   a first sealing material between the first substrate and the second substrate;
   a conductive particle which electrically connects the connection wiring to the opposite electrode between the first substrate and the second substrate; and
   a first space and a second space which are surrounded by the first sealing material between the first substrate and the second substrate,
   wherein the first space overlaps the connection wiring and a second sealing material containing the conductive particle is disposed inside the first space,
   wherein the second space overlaps the pixel electrode and a liquid crystal layer is disposed inside the second space,
   wherein the first sealing material is formed in a boundary between the first space and the second space,
   wherein a shape of a top surface of the first space is a polygon or a fan-like form, and
   wherein an outer peripheral shape of the first sealing material is a rectangle and the first space is disposed at each corner of the rectangle.

2. The liquid crystal display device according to claim 1, wherein the conductive particle comprises an organic material having conductivity.

3. The liquid crystal display device according to claim 1, wherein the conductive particle is in contact with the second sealing material.

4. A liquid crystal display device comprising:
   a first substrate comprising a display portion comprising a pixel electrode, a conductive portion, and a terminal portion;
   a second substrate comprising an opposite electrode; and
   a liquid crystal layer between the first substrate and the second substrate,
   wherein a first space is surrounded by a sealing material between the first substrate and the second substrate, and the first space overlaps the conductive portion,
   wherein a second space is surrounded by the sealing material between the first substrate and the second substrate, and the second space overlaps the display portion,
   wherein a first portion of the sealing material is disposed between the display portion and the terminal portion,
   wherein a second portion of the sealing material is disposed between the conductive portion and the terminal portion,
   wherein a third portion of the sealing material is disposed between the display portion and the conductive portion,
   wherein the terminal portion has a first connection terminal and a second connection terminal,
   wherein the first connection terminal is electrically connected to the opposite electrode through the conductive portion,
   wherein the second connection terminal is electrically connected to the pixel electrode,
   wherein a shape of a top surface of the first space is a polygon or a fan-like form, and
   wherein an outer peripheral shape of the sealing material is a rectangle and the first space is disposed at each corner of the rectangle.

5. The liquid crystal display device according to claim 4, wherein an organic material having conductivity is disposed in the first space.

6. The liquid crystal display device according to claim 4, wherein a second sealing material is provided in the conductive portion and a conductive particle is contained in the second sealing material.

7. The liquid crystal display device according to claim 4, wherein a connection wiring which is electrically connected to the first connection terminal is provided in the conductive portion and a conductive particle is provided between the connection wiring and the opposite electrode.

8. A method for manufacturing a liquid crystal display device, comprising:
forming a first sealing material over one substrate of a pair of substrates;
forming a second sealing material containing a conductive particle over a first region surrounded by the first sealing material;
dropping a liquid crystal over a second region surrounded by the first sealing material; and
attaching the pair of substrates to each other under a reduced pressure,
wherein the first sealing material is formed in a boundary between the first region and the second region,
wherein a shape of a top surface of the first region is a polygon or a fan-like form, and
wherein an outer peripheral shape of the first sealing material is a rectangle and the first region is disposed at each corner of the rectangle.

9. The method according to claim 8, wherein formation of each of the first sealing material and the second sealing material is performed by an ink jet method.

10. A method for manufacturing a liquid crystal display device, comprising:
forming a sealing material over one substrate of a pair of substrates;
dropping a composition containing an organic material having conductivity over a first region surrounded by the sealing material;
dropping a liquid crystal over a second region surrounded by the sealing material; and
attaching the pair of substrates to each other under a reduced pressure,
wherein the sealing material is formed in a boundary between the first region and the second region,
wherein a shape of a top surface of the first region is a polygon or a fan-like form, and
wherein an outer peripheral shape of the sealing material is a rectangle and the first region is disposed at each corner of the rectangle.

11. The method according to claim 10, wherein the composition containing the organic material having conductivity contains a nanoparticle.

12. The method according to claim 10, wherein application of the composition containing the organic material having conductivity is performed by an ink jet method.

13. The method according to claim 10, wherein the sealing material is formed by an ink-jet method.

14. The liquid crystal display device according to claim 1, wherein an inner peripheral shape of the first sealing material is an octagon.

15. The liquid crystal display device according to claim 4, wherein an inner peripheral shape of the sealing material is an octagon.

16. The method according to claim 8, wherein an inner peripheral shape of the first sealing material is an octagon.

17. The method according to claim 10, wherein an inner peripheral shape of the sealing material is an octagon.

* * * * *